United States Patent
Ishizu et al.

(10) Patent No.: US 8,526,375 B2
(45) Date of Patent: *Sep. 3, 2013

(54) COMMUNICATION CONNECTION DEVICE

(75) Inventors: Kentaro Ishizu, Koganei (JP); Homare Murakami, Koganei (JP); Hiroshi Harada, Koganei (JP)

(73) Assignee: National Institute of Information and Communications Technology, Tokyo (JP)

( * ) Notice: Subject to any disclaimer, the term of this patent is extended or adjusted under 35 U.S.C. 154(b) by 389 days.

This patent is subject to a terminal disclaimer.

(21) Appl. No.: 12/700,371

(22) Filed: Feb. 4, 2010

(65) Prior Publication Data

US 2010/0195608 A1   Aug. 5, 2010

(30) Foreign Application Priority Data

Feb. 5, 2009   (JP) .................................. 2009-025424

(51) Int. Cl.
    *H04W 4/00*   (2009.01)
(52) U.S. Cl.
    USPC .......................................... 370/329; 370/341
(58) Field of Classification Search
    None
    See application file for complete search history.

(56) References Cited

U.S. PATENT DOCUMENTS

| 2004/0248610 | A1* | 12/2004 | Chan ........................ | 455/550.1 |
| 2005/0181792 | A1* | 8/2005 | Kobayashi et al. ........ | 455/435.2 |
| 2007/0021060 | A1* | 1/2007 | Karabinis et al. ........... | 455/12.1 |
| 2008/0125113 | A1* | 5/2008 | Kono ........................ | 455/432.1 |

FOREIGN PATENT DOCUMENTS

JP   2002-141929 A   5/2002

OTHER PUBLICATIONS

Allied Telesis Ltd. News Release, "IEEE 802.11a/b/g wireless LAN access point "AT-TQ2403" for the WPA/WPA2 security is newly put on the market from new brand TenQ series of a wireless product," available at http://www.allied-telesis.co.jp/info/news/2006/nr061213.html, published Dec. 13, 2006, p. 1 of 1.
Triplet Gate Ltd. News Release, available at http://www.tripletgate.com/wirelessgate/news/homeantenna.pdf, Oct. 21, 2008, pp. 1-3.

* cited by examiner

*Primary Examiner* — Derrick Ferris
*Assistant Examiner* — Kodzovi Acolatse
(74) *Attorney, Agent, or Firm* — Abelman, Frayne & Schwab

(57) ABSTRACT

The present invention provides a technique capable of processing to automatically and optimally select types of external networks and a communication system, and at the same time, capable of switching network selection upon a user's arbitrary opportunity. A communication connection device 1 is provided with: a network communication adaptor 13 connecting a terminal device 4; external network communication adaptors 11, 12 compatible with external networks; a network selection processing portion 102 automatically selecting a network from the external networks according to profile information 141 previously including at least one of types of networks and a communication system; re-selection processing instruction mechanisms 15, 103 designed to cause, as a result of a user's operation, the network selection processing portion 102 to start selection processing.

8 Claims, 10 Drawing Sheets

COMMUNICATION CONNECTION DEVICE

CROSS-REFERENCE TO RELATED APPLICATIONS

This application is related to and claims priority under 35 USC §119(a) to Japanese Patent Application 2009-025424 filed on Feb. 5, 2009 which is incorporated by reference herein.

BACKGROUND OF THE INVENTION

1. Field of the Invention

The present invention relates to a communication relay device relaying communication between an internal network and an external network, and particularly relates to a technique selecting types of external networks to be connected or a communication system.

2. Description of the Related Art

Heretofore, a communication relay device known as a wireless LAN access point is in widespread use as a device enabling a plurality of terminal devices to connect to external networks such as the Internet in residential or corporate settings. The device configures a LAN (Local Area Network) that is an internal network between the device and a terminal device, and is programmed with, for example, a function for routing communication from a communication terminal to an external network, a Dynamic Host Configuration Protocol (DHCP) server function for allocating an Internet Protocol (IP) address for the communication terminal, a Network Address Translation (NAT) function for performing address conversion, a Domain Name System (DNS) server function for converting a domain name and an IP address (DNS forward function), for example.

Such a communication relay device is intended to be installed at a fixed position, and thus, once connected to the external network, it is in principle that a connection destination is not changed. Upon changing it, it is necessary for a user to switch manually from a setting screen, etc., of the communication relay device. In a case of a mobile communication relay device, a communication relay device dedicated to a specific external network does not intend to change the connection destination. When the external network is a wireless LAN, a base station of the connection destination may be changed. This task is often performed manually.

On the other hand, a machine in which a connection destination is automatically changed is known. Wireless LAN access point AT-TQ2403 manufactured by Allied Telesis K.K. of Tokyo, Japan (referenced in Non-Patent Document 1) is provided with a function for automatically setting a channel by sensing surrounding wireless interference. The machine is capable of collectively managing users and collectively setting change by grouping (clustering) a plurality of access points. The device is configured to use an automatic channel management function so as to sense the level of radio wave interference of a nearby existing access point and to automatically change the channel in use of the machine within the cluster so that the interference is decreased.

In this way, a conventional technique includes two methods, i.e., that used when processing for switching base stations is automatically performed by a device, and that used when the same is performed based on a user's own determination. In the former, an algorithm or a parameter is previously determined, and for an opportunity determined thereby, executed switching processing includes scanning for switching base stations or reconstruction of the function. However, it is difficult to change the algorithm or the parameter, and there is a problem in that once the setting is made, it is not possible to flexibly change a connection method. In the latter, when the user is dissatisfied with the communication quality or when the connection is cut, the setting can be arbitrarily made for switching the connections. However, the connection based on the algorithm or the parameter, as described above, cannot be performed.

Japanese Patent Laid-Open No. 2002-141929 discloses a LAN connection device, including a plurality of physical ports, used for automatically performing exclusive connection switching on a connection between networks. This document (Patent Document 1) discloses a configuration in which a packet relay portion relays a packet between channels connected to a plurality of physical ports; a primary system switchable port that shares a channel and is exclusively connected to the shared channel by a switch circuit; a sub-system switchable port; a carrier detection portion that detects a communication carrier from the sub-system switchable port; and a switch control portion that provides control such that the sub-system switchable port is connected to the shared channel when the carrier is detected and the same switches to the primary system switchable port when there is no switch switching demand for a fixed time period from the carrier detection portion.

Japanese Patent Laid-Open No. 2002-141929 also discloses a lock control portion that inhibits switching from the primary system switchable port to the sub-system switchable port. The switch control portion holds a state of the switch circuit during a call with a communication terminal connected to a LAN, and the switch control portion executes a lock demand by the lock control portion when the lock control portion receives communication desiring a lock operation from a communication terminal. With such a configuration, it is configured so that the port is completely automatically switched safely. However, this method does not enable port switching at a user's arbitrary timing.

Another related product is "Wireless Gate Home Antenna for emobile" from TripletGate Inc. of Tokyo, Japan, which is a device that relays a connection to the Internet by High-Speed Download Packet Access (HSDPA) and provides an external connection for a terminal by wireless LAN (referenced in Non-Patent Document 2). This device is capable of Internet connection to a plurality of terminals simply when the device is installed, even in locations where wired networks cannot be utilized.

However, this device can only be connected to a single wireless operator using HSDPA. Therefore, in addition to the inability to be used outside of the HSDPA area, even an area offering a more suitable wireless access system cannot be selected.

Patent Document 1: Japanese Patent Laid-Open No. 2002-141929

Non-Patent Document 1: Internet URL, http://www.allied-telesis.co.jp/info/news/2006/nr061213.html (printed on Feb. 5, 2009);

Non-Patent Document 2: Internet URL, http://www.triplet-gate.com/wirelessgate/news/homeantenna.pdf (printed on Feb. 5, 2009)

SUMMARY OF THE INVENTION

The conventional technique has problems in the following situations. In a location or situation where a reception strength of a connected access point is weak, but it is still possible to continue some level of communication, it would be better to continue the communication "as is" if a voice-related application, etc., is being operated. The reason for that is that it takes time to switch the access points, and thus, the voice-application is interrupted. On the other hand, when no communication is performed, there is no problem even when the access points are frequently switched. Such determination is made by the user only, and assembling it into a mobile-type computer is difficult. That said, always imparting the user with an opportunity to switch is inconvenient and is not a practical solution as a mobile application (use). A mobile-type computer provided simultaneously with a function of automatically performing processing and a function of performing this processing based on the user's intention can solve this problem.

The present invention has been achieved in view of the problem inherent in the conventional technique, and an object thereof is to provide a technique capable of automatically processing and optimally selecting types of external networks and a communication system, and at the same time, is capable of switching network selection upon a user's arbitrary determination.

A communication connection device as described below is provided that overcomes the problems of the prior art, in which a communication connection device establishes communication between a terminal device and an external network, which is connected with the terminal device by the connection path.

The device is provided with: a single or a plurality of external network communication adaptors compatible with one or more external networks; and a network selection processing portion for automatically selecting a network from the external networks according to previously stored profile information including at least one of types of networks and a communication system. The device is further provided with: an external network connection processing portion for establishing or reconfiguring the connection to an external network selected by the network selection processing portion; and a communication relay processing portion for relay-processing the communication between the communication terminal and the external network.

Accordingly, the present invention automatically performs the network selection based on the profile information. In addition, the present invention is provided with a re-selection processing instruction mechanism designed to cause, as a result of a user's operation, the network selection processing portion to start selection processing.

As described herein, the connection path is configured to be an internal network connecting with a single or a plurality of specific terminal devices, and the communication connection device may include an internal network communication adaptor compatible with the internal network and an internal network connection processing portion establishing or reconfiguring the connection to the internal network.

The communication connection device may be a user-carriable mobile communication connection device. The re-selection processing instruction mechanism is formed by a switch disposed on an external surface of the device. In addition, a notification portion is provided for detecting an input operation of the switch and notifying the network selection processing portion of the detection.

The network selection processing portion may be configured to select, when there is an instruction to start the selection processing from the re-selection processing instruction mechanism, a network different from a type of external network or a communication system currently selected. The selected condition complies with the profile information.

It is possible to configure the profile information such that an order of priority of at least one of types of external networks to be connected or communication systems is defined, and the network selection processing portion selects according to the order of priority.

It is also possible to configure the profile information such that verification information necessary for connection to each external network is stored, and the external network connection processing portion establishes or reconfigures the connection to the external network by employing the verification information.

A configuration can also include a selection rule for a communication channel, when the external network is a wireless LAN, that is provided in the profile information, and the network selection processing portion acquires information about available channel at a current site from the external network connection processing portion. When there is an available channel in this configuration, an available channel table tabulates, for each channel, numbers of available channels continued before and after a currently selected channel is produced, and the channel is selected according to an available status on the available channel table.

It can also be possible to provide in the profile information a selection rule for a communication channel when the external network is a wireless LAN, in which the network selection processing portion acquires a signal strength of a channel in use at a current site from the external network connection processing portion. In this configuration, it is possible to produce a signal strength table that tabulates signal strengths of channels in use, and select the channel according to the signal strength for each channel on the signal strength table.

In a configuration capable of producing the available channel table and the signal strength table, when there is an available channel on the available channel table, a channel with a largest number of available channels continued in back and forth directions may be selected. On the other hand, when there is no available channel, a channel having a weakest signal strength from the signal strength table may be selected.

As a result of including the above-described configuration, the present invention provides the following effects: The provision of the network selection processing portion enables automatic selection of types of external networks or a communication system. Also, the provision of the re-selection processing instruction mechanism enables the execution of the network re-selection processing at an arbitrary timing. According to the conventional configuration, in a configuration to automatically select the network, there are only two choices, i.e., the selection is made at the initial connection and no further re-selection is later made, or the network is changed irrespective of the user's intention even during the connection. Also, when the network is manually selected, the user needs to decide which network is the optimal, or test the network.

On the contrary, according to the present invention, the user is capable of selecting the optimal network at a point in time at which the user feels it is necessary to switch the network selections by operating the re-selection processing instruction mechanism.

When the connection path is the internal network, the utilization can be made from a plurality of terminal devices connected to the internal network. Also, when the device is turned into a mobile communication connection device, the user is capable of operating the device at the user's new destination. In this case, however, the user needs to select the network outside his/her own environment and thus, it is difficult for him/her to select the optimal network. With this situation in mind, when the switch disposed on the external surface is used, the network can be easily selected. In this way, the convenience for the user can be significantly increased.

In a configuration in which when there is an instruction to start the selection processing from the re-selection processing instruction mechanism, a network different from the type of the external network or a communication system currently selected is selected based on the profile information. The network selection in which the operation by the user of the re-selection processing instruction mechanism is assigned importance is enabled. When the current network is selected in a usual selection processing, if the user operates, processing for switching to a type of network or a communication system different from that network is performed. Thereby, it becomes possible to reflect the user's intention, i.e., desire to change the networks.

When verification information necessary for connection with the external network is stored in the profile information, it is possible to automatically make this mobile communication relay device utilizable for services that need verification such as a connection to a wireless LAN service when going outside.

By providing a wireless LAN communication channel selection rules to the profile information, the optimal channel for communication can be selected in locations where a plurality of communication channels are employed. In particular, if an available channel table is created, it is possible to easily realize communication employing a channel having a large number of available channels in a back and forth direction.

With a configuration to acquire a signal strength for a channel in use, the level of signal interference is taken into consideration from the signal strength, which serves to select the optimal channel for the communication. Combined with the above-described operation, if there are available channels in back and forth directions, that channel is selected; if not, a channel with a weaker signal strength can be selected. Furthermore, if neither selected channel can be found, another external network can be selected.

BRIEF DESCRIPTION OF DRAWINGS

The invention will be described in further detail below and with reference to the attached drawings in which the same or similar elements can be referred to by the same number, and where.

DETAILED DESCRIPTION OF THE INVENTION

Figure 1:
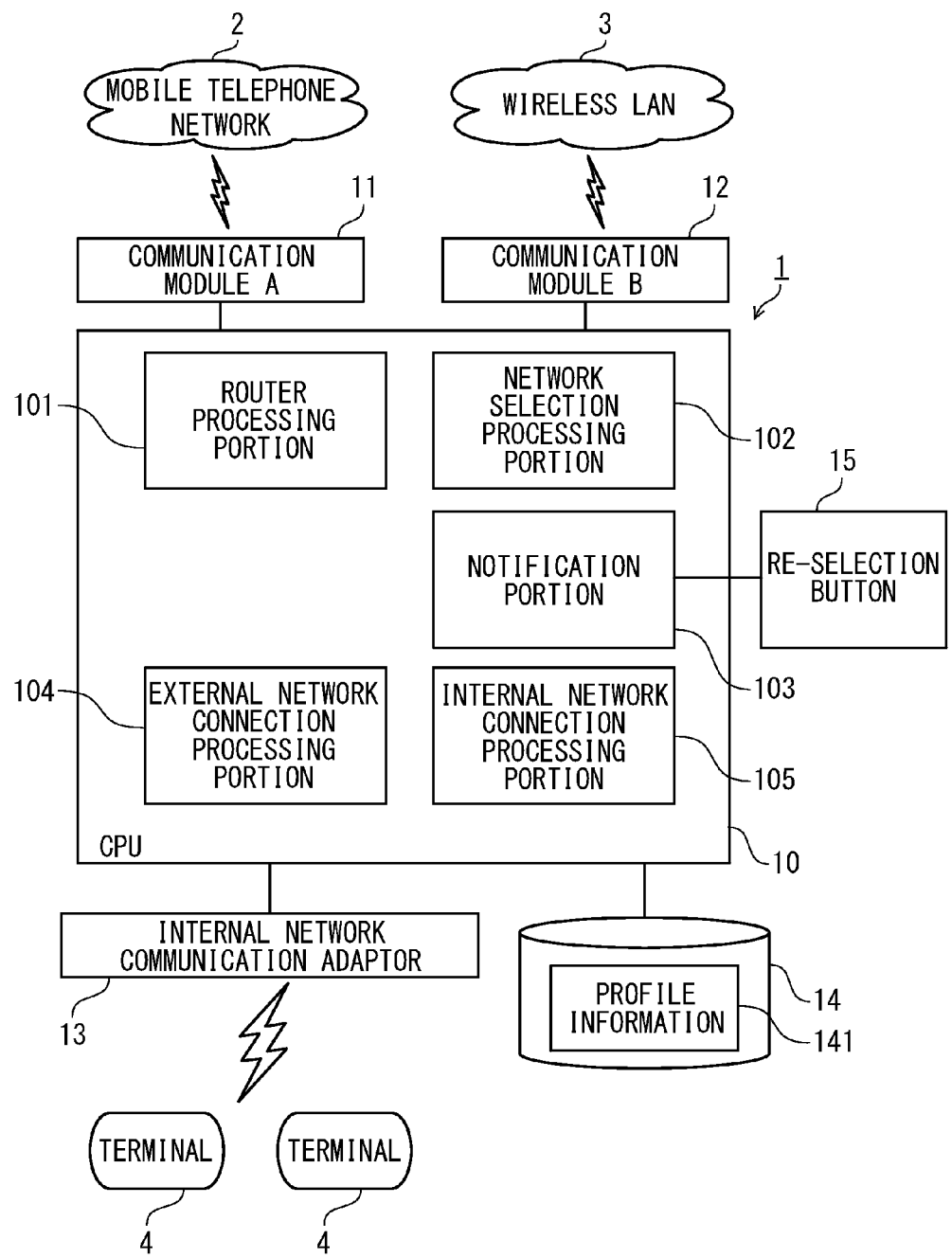
FIG. 1 is a configuration diagram of a communication connection device according to the present invention.

Hereinafter, embodiments of the present invention will be described based on embodiments shown in the drawings. It is noted that the embodiments are not limited to those given below. The present invention provides a communication connection device capable of, upon selecting networks, automatically and manually presenting an opportunity to start the processing. The present invention realizes a communication connection device capable of performing both of: processing for selecting networks that has been automatically accomplished by a device in a conventional technique; and processing for selecting networks that is done by a user's own determination. With this, automatic processing can be implemented in other cases while the user's intention is reflected.

FIG. 1 is a configuration diagram of a communication connection device (1) according to a first embodiment of the present invention. The present invention can be easily provided to a mobile wireless LAN router as disclosed in Non-Patent Document 2 by packaging functions of the present invention.

Hardware for this device (1) includes: a Central Processing Unit (CPU) (10) configuring an execution processing portion for performing the processing portions of the present invention; a communication module A (11) for communicating via a mobile telephone network (2) as an external network communication adapter; a communication module B (12) for connecting to a wireless LAN (3) in a wireless hotspot, e.g., a public wireless hotspot, or a residential or corporate wireless LAN; an internal network communication adapter (13) for communicating with a user's terminal (4); storage device (14) such as a memory in which profile information (141) described herein is stored; and a re-selection button (15) that is an exemplary re-selection processing instruction mechanism according to the present invention.

The communication modules (11) and/or (12) are communication modules for connection to wireless communication networks such as a mobile telephone communication card, a Personal Handy-phone System (PHS) data communication card, and a wireless LAN card, and are widely provided in a Compact Flash (CF) card, a Peripheral Component Interconnect (PCI) card, a Universal Serial Bus (USB) connection device, or the like. In general, a single antenna is installed on a communication module but joint use is possible if the antenna is near a frequency used, and jointly used antennas are acceptable with differing communication modules.

In the present invention, connection to the terminal (4) may be achieved by any mode, and the connection can be made by an arbitrary connection route. For example, in addition to a direct connection configuration which is achieved by a wired route such as a USB cable and that which is achieved by a wireless route such as Bluetooth®, that which is achieved by providing an internal network as in the first embodiment may be adopted.

The internal network communication adapter (13) is a device for configuring an internal network, and can be configured by a wireless LAN adapter or a Bluetooth® adapter. The internal network communication adapter (13) can be installed separately from each of the above-described communication modules (11) and/or (12) but in reality, can be jointly used for an external network connection and an internal network connection. The same is true of the antenna.

Of course, this embodiment is one embodiment of the invention, and the number of communication modules and configurations can be established as desired. A single communication module can be made compatible with a plurality of wireless communication networks on a software basis.

The CPU (10) includes: a router processing portion (101) for providing relay processing of communication between an internal network and an external network as well as a well-known router function; a network selection processing portion (102) for automatically selecting the external network according to profile information (141); a notification portion (103) for notifying the network selection processing portion (102) of an operation by the re-selection button (15); an external network connection processing portion (104) for connecting to the external network; and an internal network connection processing portion (105) for connecting to the internal network.

The router processing portion (101) includes a well-known NAT function to thereby reciprocally convert an external network IP address to an internal network local address so that communication between the terminal (4) within the internal network and the external network is routed.

There is also provided a DHCP server function that can automatically assign a local address to the terminal (4). A DHCP server can also assign a gateway server address, a DNS server addresses, a subnet mask, etc. Furthermore, there is also provided a DNS server (DNS forward) function that reciprocally converts a domain name and an address.

However, in a configuration in which the device (1) is directly connected to the single terminal device on the connection route, the router function as described above may not be provided. Alternately, the communication data with the communication modules (11) and/or (12) may simply be relayed to the terminal device.

In the first embodiment, the device (1) is of mobile type. The mobile communication connection device is characterized in that a use location is changed. An examples of external network that can be used in the widest area includes the mobile telephone network (2), and depending on a user's contract condition, the communication charges may be high. Also, with a current service, the communication speed may not be sufficient. However, if connecting to a residential or company wireless LAN or connecting to a wireless LAN in a street hotspot, the area may be extremely limited but advantages are provided to the user in terms of communication charges and communication speed.

To solve this, the network selection processing portion (102) in the present invention references the profile information (141), and automatically selects the optimal network from a plurality of external networks. A selection rule in this embodiment will be described. First, as shown in Table 1, a predetermined order of connection priority with respect to external networks that are candidates for connection is stored in the profile information (141). As shown in Table 1, a method for defining the order of priority can be defined for each service or access point, or can be defined for each communication system (protocol, etc.). Both can also be defined.

TABLE 1

| order of priority | Service |
| --- | --- |
| 1 | Household wireless LAN |
| 2 | Company A hotspot |

TABLE 1-continued

| order of priority | Service |
| --- | --- |
| 3 | Company B PHS |
| 4 | Company C data communication service |
| 5 | Company D mobile telephone service |

The simplest selection rule is that define only in Table 1. When first connecting to the external network, the communication module attempts to connect from a service with the highest priority. According to Table 1, first, the communication module B (12) scans the wireless LAN and if there is a household wireless LAN Service Set Identifier (SSID), connection is made with that access point. If the household SSID is not discovered, a hotspot of Company A is searched.

Figure 2:
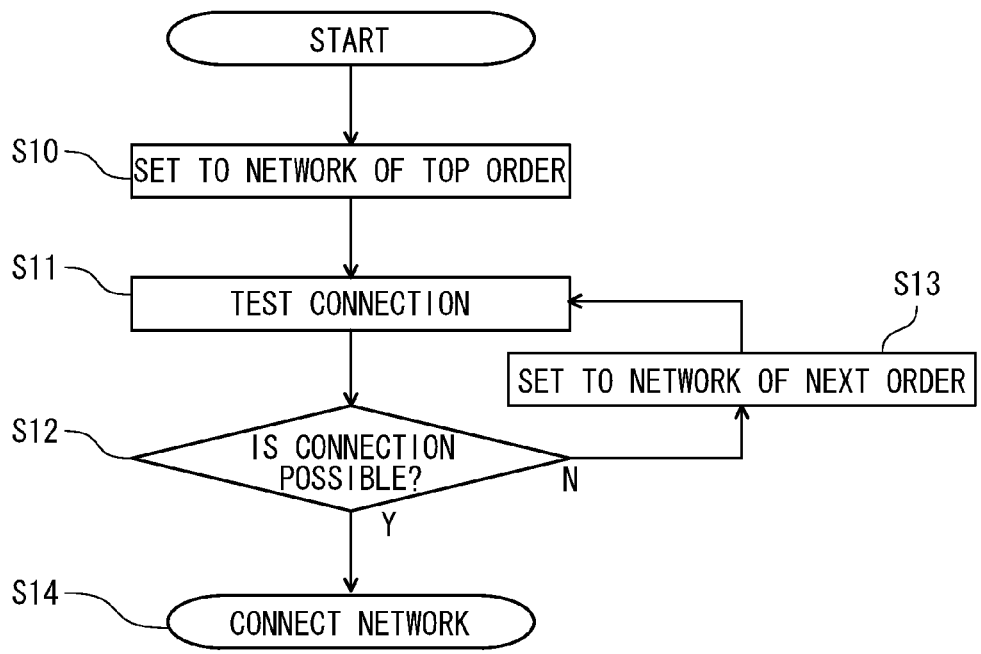
FIG. 2 is a flowchart showing a method of selecting an external network according to the present invention.

Neither the first or second priority can be found, a PHS communication module (not shown) is employed in an attempt to connect to a PHS circuit of Company B. If a PHS radio wave is detected here, a connection is made. FIG. 2 shows a flowchart of this situation. First, a network of a top priority order is set (S10), the connection is tested (S11) and if the connection cannot be made (S12), a network of a next order is set (S13). Connection testing (S11) is repeated until the connection is made. When the connection is successfully established, the network connection (S14) is maintained.

If the external network connected by the network selection processing portion (102) is selected, the external network connection processing portion (104) performs connection processing for that service. The connection processing uses a well-known technique, and in the present invention, miscellaneous information needed for a connection can be provided in the profile information (141).

The information needed for a connection includes a telephone number for a connection destination upon connection to a mobile telephone network or a PHS network, and an SSID or WEP (Wired Equivalent Privacy) confidential key upon wireless LAN connection. Additionally, upon connection to services requiring verification, it is possible to include verification information such as a user name and a password for a dialup connection as well as a user name and a password to enable the utilization of certain hotspots. The external network connection processing portion (104) reads these pieces of miscellaneous information from the profile information (141) so as to perform the network connection processing.

In the present invention, the networks are not switched until the user depresses the re-selection button (15) after the network connection. Thus, there is no risk of call interruption even when an application being executed at the terminal is a voice call. On the other hand, when the re-selection button (15) is depressed, network re-configuration processing is performed. This processing is shown in FIG. 3.

When the notification portion (103) senses that the re-selection button (15) is depressed during the network connection (S14), the network selection processing portion (102) is notified (S21) of the depression. Upon this opportunity, the network selection processing portion (102) performs the network re-configuration processing. That is, the network of the top priority order is set again (S22), the connection is tested (S23) and if the connection cannot be made (S24), a network of a next order is set (S25). Connection testing (S23) is repeated until the connection is made.

When a connectable network is found, the network re-configuration (S26) processing is performed. To reconfigure a connection between different services, a technique relating to switching networks such as an existing handover technique can be employed where appropriate. Also, as indicated herein, a technique for switching a combination of linked communication networks by link aggregation can be employed. With the re-configuration (S26), the network is connected (S27).

Figure 3:
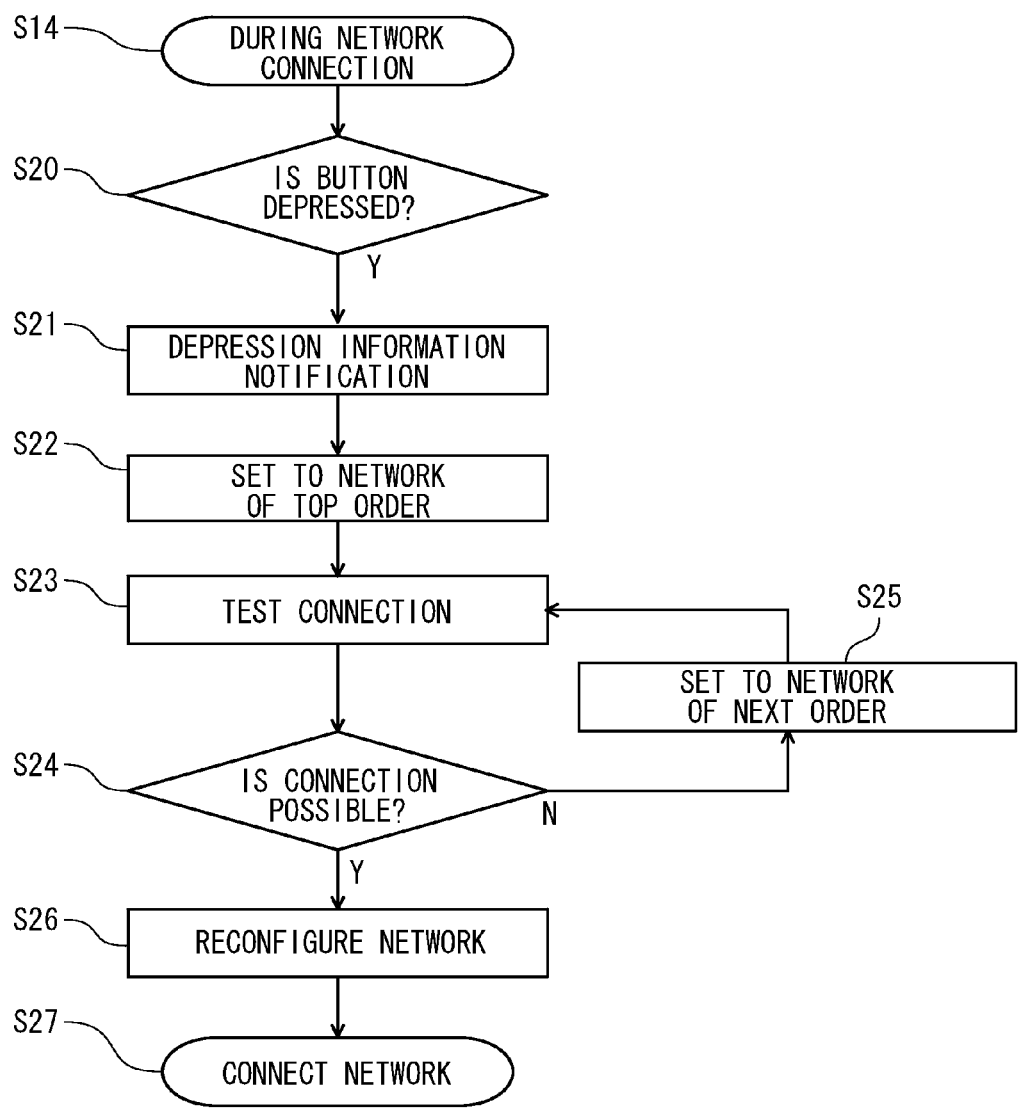
FIG. 3 is a flowchart showing a method of re-selecting an external network according to the present invention.
Figure 4:
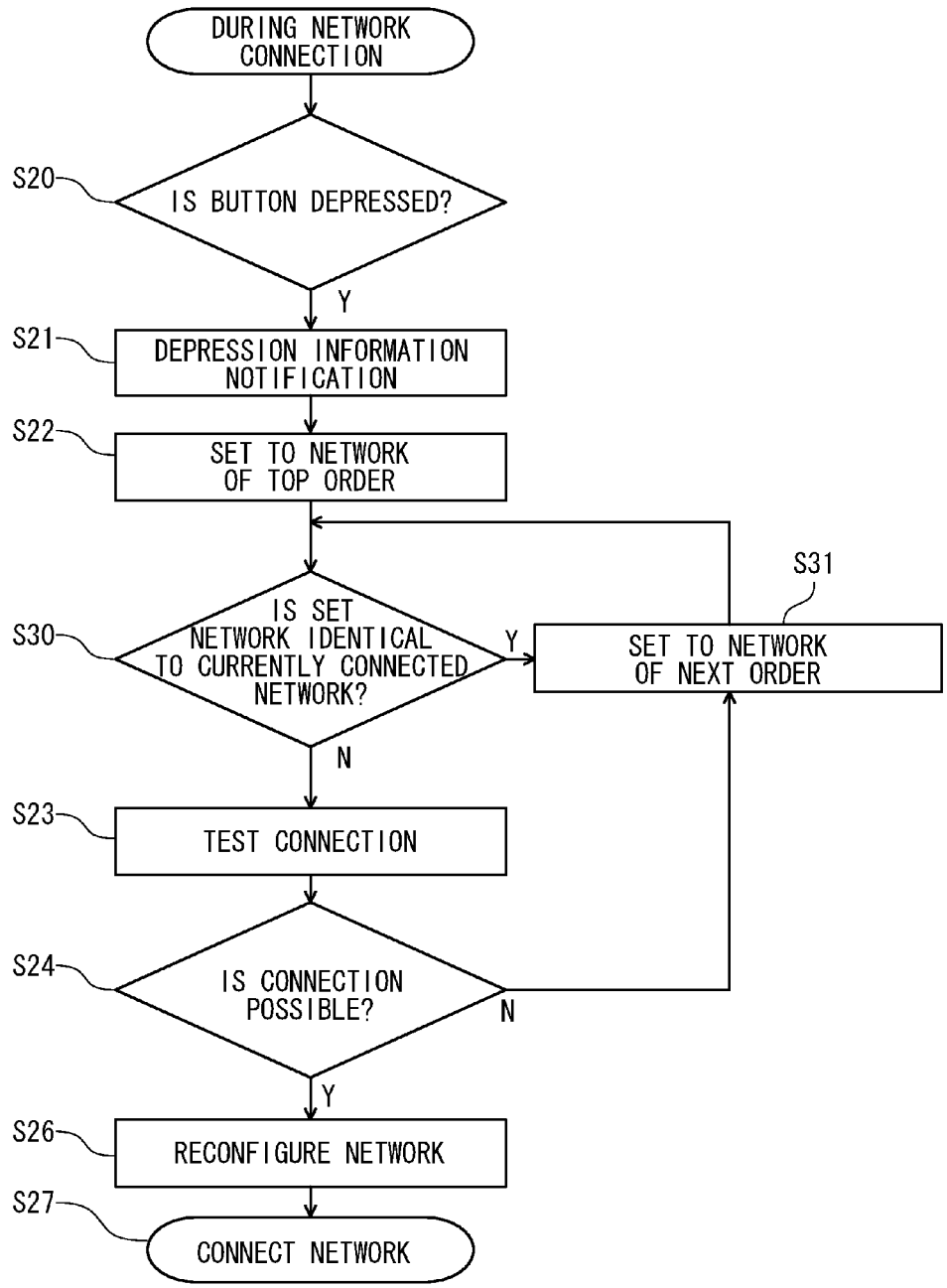
FIG. 4 is a flowchart showing a method of re-selecting an external network according to the present invention.

In the present invention, in addition to the configuration of FIG. 3, by using a method shown in FIG. 4, the network may be optionally selected in order to exactly reflect a user's intention. In this case, it is characterized in that when the re-selection button (15) is depressed, if the currently selected network has the highest level of priority, and is out of the range of connectable networks, a selection switch is made to a network having a next highest level of priority.

After the network of the top priority order is set (S22), the network selection processing portion (102) determines whether the set network is identical to the currently connected network (S30). If not identical, the connection is tested (S23) as in the case described above. If identical, that network is skipped, and a network of a next priority order is set (S31).

When the user depresses the re-selection button (15), the network selection that fits the user's intention is realized by performing the above-described processing because it is regarded that the user is not satisfied with the current network.

Further, the processing in FIG. 3 and that in FIG. 4 may be optionally distinguished by how the re-selection button (15) is depressed. For example, if depressed once, the optimal network may be simply selected as shown in FIG. 3; if depressed twice, processing to force switching to a different network may be performed as shown in FIG. 4.

It is acceptable to employ an arbitrary wireless network as the external network in the present invention. In addition to the above-described wireless LAN (conforming to 802.11b/g) and PHS, it is acceptable to employ HSDPA (High Speed Downlink Packet Access) utilizing a mobile telephone network, a future standard WiMax (Worldwide Interoperability for Microwave Access), a next generation PHS, or the like. In addition, the connection may be optionally directly made to the external networks by using a LAN cable, a USB cable, etc.

A method for establishing an internal network connection will be described. Information necessary for an internal network configuration can also be stored in the profile information (141). In this embodiment, a wireless LAN module is employed for the internal network communication adapter (13) so as to connect using the terminal (4) and the wireless LAN. The wireless LAN conforms, for example, to IEEE802.11b/g, and uses WEP for encryption.

The internal network can be established by any method as long as it is possible to configure a network. For example, a configuration in which a LAN port is arranged and the terminal (4) is connected with a LAN cable is acceptable. There may be a plurality of LAN ports so as to achieve a hub function. Also, a wireless LAN module may be included together therewith.

Figure 5:
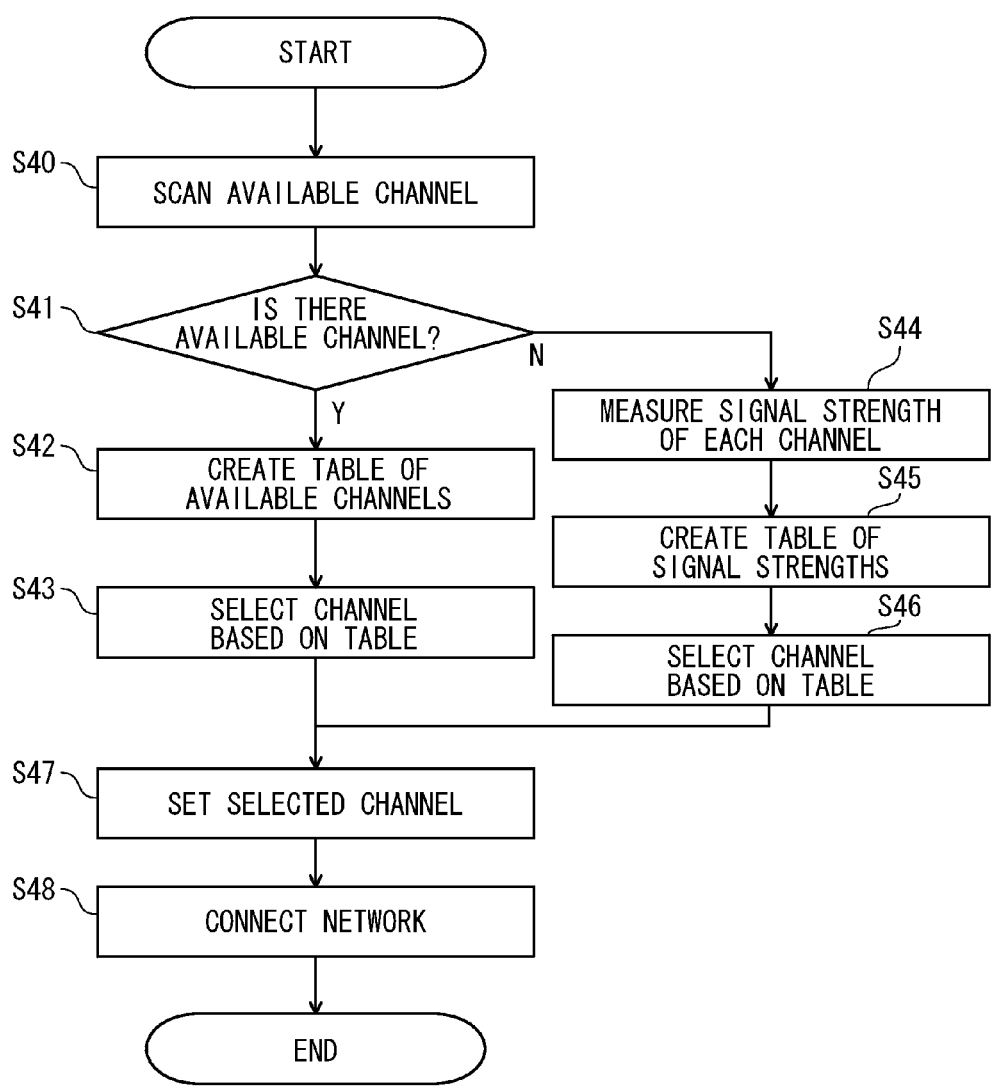
FIG. 5 is a flowchart showing a method of determining a channel of an internal network according to the present invention.

As shown in FIG. 5, information on an available channel or on a signal strength is employed for selecting channels used for the wireless LAN in the present invention. First, the internal network connection processing portion (105) operation enables the internal network communication adapter (13) to scan (S40) for available channels in the installed position of this device (1). Channels 1 to 14 can be utilized with 802.11b and channels 1 to 13 can be utilized with 802.11g, but for this embodiment, channels 1 to 11 are utilized.

If the results of the scan show available channels (S41), the available channels for each channel in back and forth directions are tabled (S42). For example, as shown by the scan results in Table 2, if the access points in the vicinity use channel 6 and channel 11, an available channel table is as shown in Table 3.

TABLE 2

(Scan Result)

| 1ch | 2ch | 3ch | 4ch | 5ch | X 6ch | 7ch | 8ch | 9ch | 10ch | X 11ch |
|-----|-----|-----|-----|-----|-----|-----|-----|-----|------|------|

TABLE 3

(Available Channel Table)

| channel | No. of channels available in front direction | No. of channels available in back direction |
|---------|---------------------------------------------|---------------------------------------------|
| 1ch | 4 | 4 |
| 2ch | 5 | 3 |
| 3ch | 6 | 2 |
| 4ch | 7 | 1 |
| 5ch | 8 | 0 |
| 6ch | x | x |
| 7ch | 0 | 3 |
| 8ch | 1 | 2 |
| 9ch | 2 | 1 |
| 10ch | 3 | 0 |
| 11ch | x | x |

If the internal network connection processing portion (105) described above creates an available channel table by obtaining scan results from the internal network communication adapter (13), channel 1 has four channels available in a front direction and channel 11 has no channel available in a back direction. Additionally, for example, a search is made for channels with four or more channels available in back and forth directions in order from a channel with the lowest number, and a channel that is found first is selected (S43). In the example in Table 3, a channel 1 has four or more channels available in back and forth directions and so the channel 1 is selected. The reason why the number of channels is four or more is that if there are intervals with four or more channels, then good communication can be performed. However, for example, five channels or three channels can also be used for this value.

If there is no space available of four or more channels in back and forth directions, a threshold value is decreased to three channels in the same directions and then to two channels in the same directions. For example, scan results and an available channel table when access points in the vicinity use channel 1 and channel 6 are as found in Tables 4 and 5.

TABLE 4

(Scan Result)

| 1ch | 2ch | 3ch | 4ch | 5ch | 6ch | 7ch | 8ch | 9ch | 10ch | 11ch |
|---|---|---|---|---|---|---|---|---|---|---|
| X |  |  |  |  | X |  |  |  |  |  |

TABLE 5

(Available Channel Table)

| channel | No. of channels available in front direction | No. of channels available in back direction |
|---|---|---|
| 1ch | x | x |
| 2ch | 0 | 3 |
| 3ch | 1 | 2 |
| 4ch | 2 | 1 |
| 5ch | 3 | 0 |
| 6ch | x | x |
| 7ch | 0 | 4 |
| 8ch | 1 | 3 |
| 9ch | 2 | 2 |
| 10ch | 3 | 1 |
| 11ch | 4 | 0 |

According to Table 5, there are no channels with four channels or three channels available in back and forth directions, and thus, a channel with two channels available, i.e., channel 9, is selected. If there are only a smaller number of available channels, the channel is selected in a manner to increase the channels in back and forth directions as much as possible. Examples in Tables 6 and 7 below are situations when the access points in the vicinity use channel 1, channel 6 and channel 11.

TABLE 6

(Scan Result)

| 1ch | 2ch | 3ch | 4ch | 5ch | 6ch | 7ch | 8ch | 9ch | 10ch | 11ch |
|---|---|---|---|---|---|---|---|---|---|---|
| X |  |  |  |  | x |  |  |  |  | X |

TABLE 7

(Available Channel Table)

| channel | No. of channels available in front direction | No. of channels available in back direction |
|---|---|---|
| 1ch | x | x |
| 2ch | 0 | 3 |
| 3ch | 1 | 2 |
| 4ch | 2 | 1 |
| 5ch | 3 | 0 |
| 6ch | x | x |
| 7ch | 0 | 3 |
| 8ch | 1 | 2 |
| 9ch | 2 | 1 |
| 10ch | 3 | 0 |
| 11ch | x | x |

In the above case, there were no channels that have two channels available in back and forth directions. Of the channels with one or more channels available in back and forth directions, channel 3 has one channel in a front direction and two channels in a back direction; channel 4 has two channels in a front direction and one channel in a back direction; channel 8 has one channel in a front direction and two channels in a back direction; and channel 9 has two channels in a front direction and one channel in a back direction. Sums of the channels in back and forth directions are both three channels, and thus, the channel 3 is selected since it is the lowest channel number (S43). Based on only the sum of the channels in back and forth directions, channel 5 has the same sum (it has three channels in a front direction and 0 channels in a back direction). However, if the channels are adjacent (if there are 0 available channels), since it is easier to encounter interference, the one with available channels in back and forth directions is prioritized.

On the other hand, if there are no available channels (S41), the internal network communication adapter (13) measures a signal strength of a radio wave from each access point (S44). Additionally, the internal network connection processing portion (105) creates a table of the signal strength (S45). An example of the signal strength table at this point is shown in Table 8.

TABLE 8

(Table of Signal Strengths of channels used)

| channel | signal strength |
|---|---|
| 1ch | −90 db |
| 2ch | −60 db |
| 3ch | −95 db |

TABLE 8-continued (Table of Signal Strengths of channels used)

| channel | signal strength |
|---|---|
| 4ch | −88 db |
| 5ch | −60 db |
| 6ch | −50 db |
| 7ch | −40 db |
| 8ch | −55 db |
| 9ch | −72 db |
| 10ch | −80 db |
| 11ch | −67 db |

In this case, by selecting the channel with the lowest signal strength, the interference can be held to a minimum. In the case of Table 8, channel 3 is selected (S46). The above-described channel selection processing (S43) is performed (S46) according to whether or not there are available channels, and those resulting selected channels are set as the internal network wireless LAN channel (S47). The internal network connection processing portion (105) performs connection processing with these channels (S48).

As another embodiment, detection of available channels and measurement of the signal strength can be combined, and when detecting the available channels, only the channels greater than a predetermined threshold value may be optionally detected. The reason for that is that if there are channels with sufficiently low signal strength, there will be less likelihood of communication interference.

If the internal network can select a plurality of networks such as a wired LAN and a wireless LAN, an order of priority may be optionally stored in the profile information (141) similarly to the external network. For example, in the case of being able to connect using a wired LAN, the wired LAN is wired to connect to the terminal (4) to enable selection of a wireless LAN only when connection is not possible.

A method for selecting channels in such a wireless LAN can be employed for the wireless LAN connection as the external network. That is, the access points in the vicinity are scanned with the communication module B (12) to create an available channel table. Then, the channel is selected according to the method for selecting channels shown in FIG. 3.

The scan at this point is a scan for performing a good connection with the access points registered in the profile information (141) by using the external network, and for this reason, a channel currently used by the access point to be connected should be an available channel. Also, if the channel currently in use is optimal from the above-described available channel table or if there is no concern of interference, that channel can be used as is.

On the other hand, if there is great concern of interference for the channel currently in use, the current channel is switched to another channel. To change a subject slightly, the current case is that where the external network side is the access point, which is different from the case of the internal network where this device (1) is the access point, and thus, to change the communication channel, it is necessary that the access point is firstly connected with the channel employed by the access point side and the channel that should be used is notified. As a result, a setting change acceptance portion (not shown) compatible with this device (1) is provided on the access point, and when there is a request to change the communication channel from this device (1), the current channel is changed to the channel to establish the connection. According to this method, it is possible to set a channel employed for communication with an access point while avoiding a channel that is easily subject to interference in positions of this device (1).

Figure 6:
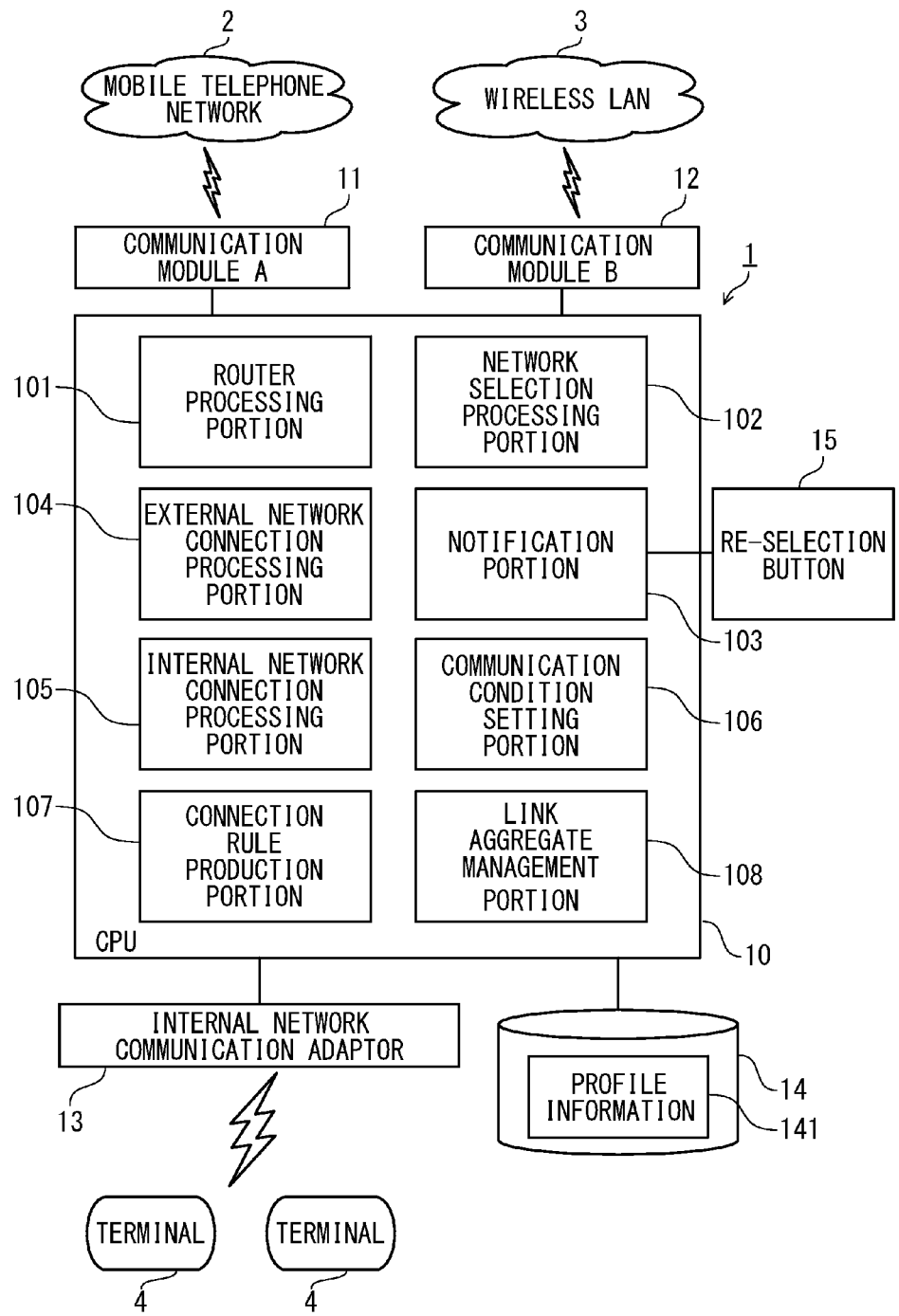
FIG. 6 is a configuration diagram of a mobile communication relay device according to a second embodiment of the present invention.

In a further embodiment of the present invention, it is possible to perform network selection processing in the network selection processing portion (102) to satisfy the required conditions for the communication parameters needed by the terminal (4). This processing is described in further detail herein. FIG. 6 is a configuration diagram of this device (1) according to this embodiment.

First, based on the type of application executed by an application execution processing portion of the terminal (4) (not shown), it is possible to set a band, a delay, a jitter, a loss rate, etc., needed by the communication conditions setting portion. As is well known, depending on the type of applications, there are different standards for a communication quality such as a standard requiring high volume throughput or that requiring a low error rate. As described, the communication conditions setting portion (106) is arranged on the CPU (10), but it can optionally be arranged on the terminal (4).

As a method for acquiring the type of application, a packet that goes through the internal network communication adapter (13) or a packet that is processed in the router processing portion (101) may be monitored, and an application type or name can be specified from that packet mode. In particular, a method for specifying the types will be described by classifying into voice call, video streaming, file transfer or other application. The reason for such classification is that in these applications, it cannot be said that if the throughput is merely high, the quality of the communication on such applications improves; the selection needs to be made taking also a packet loss and a jitter for each base station into consideration.

First, with respect to a voice call, when out of relay UDP (User Datagram Protocol) packets, a series of packets (having the same destination address) in which the average throughput is less than 32 kbps and that throughput is continued for two or more seconds are detected, detection is made such that the voice call application is being executed.

With respect to a video streaming application, when out of the relay UDP packets, a series of packets (having the same destination address) in which the average throughput is equal to or more than 32 kbps and that throughput is continued for two or more seconds are detected, detection is made such that the video streaming application is being executed.

With respect to a file transfer application that conducts downloading or uploading with a certain server, when the following packet is detected, detection is made such that the file transfer application is being executed. That is, a series of packets (having the same destination address) or TCP (Transmission Control Protocol) packets transmitted or received by the terminal (4), in which a destination port number is either 80, 21 or 20, average throughput is equal to or more than 32 kbps, and that throughput is continued for five or more seconds.

If none of the above applies, the application is classified as "other". The status of these packets is stored in an external storage device as a packet mode database. An example of the packet mode database is shown in Table 9.

TABLE 9

(Packet Mode Database)

| Protocol | average throughput | duration (time) | destination port No. | type |
|---|---|---|---|---|
| UDP | Less than 32 kbps | 2 sec or more | Indefinite | Voice call |
| UDP | 32 kbps or more | 2 sec or more | Indefinite | Video |
| TCP | 32 kbps or more | 5 sec or more | 80/20/21 | File transfer |
| Indefinite | Indefinite | Indefinite | Indefinite | others |

After detecting the types of application using any of the above methods, the necessary communication conditions are set depending on the types. In this case, the value of the communication quality may also be defined according to a database such as that shown in Table 10 for each type.

TABLE 10

(Communication Condition Database)

| type | Communication band | Delay | jitter | Loss rate |
|---|---|---|---|---|
| Voice call | 50 kbps or more | 30 mille sec or less | 10 mille sec or less | indefinite |

TABLE 10-continued (Communication Condition Database)

| type | Communication band | Delay | jitter | Loss rate |
|---|---|---|---|---|
| Video | 200 kbps or more | 10 mille sec or less | 50 mille sec or less | 5% or less |
| File transfer | 500 kbps or more | 100 mille sec or less | 50 mille sec or less | 10% or less |
| Others | Indefinite | 300 mille sec or less | 80 mille sec or less | 15% or less |

As described above, the present invention is not limited to the communication quality required by the usable wireless link or application, but can employ various communication conditions. When considering a general communication condition, the following are of importance: (1) wireless information, (2) communication quality, (3) stability, (4) cost, and (5) power consumption.

(1) Wireless Information (Radio Frequency (RF))

In order for the communication connection device (1) to utilize a wireless resource, firstly, this device (1) needs to be in a coverage area of the wireless resource. To know what type of wireless resources are utilizable when a certain terminal is in a certain position, there are alternate methods. One is that the terminal itself scans to search around, and another is to obtain the information from a server device in the external network. It is noted that this system can properly use in combination these methods.

With the latter method, it suffices if a server device that covers a plurality of wireless access networks (for example, a large number of hotspots) has information on the coverage areas of each wireless access network. This information is stored in a hard drive or memory, for example. This method is considered to have a greater effect when a frequency target range is wider and when it is difficult to predict which wireless resource can be utilized.

(2) Communication Quality (End-to-End QoS)

As described previously, since the necessary communication quality varies depending on each application used, not only binary information determining if the connection as described in (1) is possible but also detailed Quality of Service (QoS) information is needed. Examples of this QoS information include a delay, a jitter, a loss rate, and a utilizable band.

In particular, if a new terminal (this device) interrupts a congested wireless resource, there will be an adverse effect on the communication quality of another terminal already utilizing this wireless resource, and thus, it is considered to be important to precisely forecast what level bands will be usable by this new terminal. This utilizable band information becomes necessary information for achieving the object of this system that is designed to improve the efficiency of the use of the frequency by implementing a load balance of the whole network.

(3) Stability

In the wireless communication where the communication quality is subject to dynamic fluctuations, in addition to the instantaneous QoS information described in (2), the stability is also an important parameter. For example, there can be cases when rather than a wireless resource that can temporarily use a wide band, the stability (even if the band is narrow) is desirable.

As a specific example, when the communication is continued while the wireless resources are repeatedly switched as the user moves, it is conceivable that there will be a demand to decrease the number of times of switches as much as possible. To achieve this object, it is effective to estimate a time that the wireless resource can be utilized continuously.

(4) Cost

Depending on the user, application or type of use, it is conceivable that there will be cases where low communication charges take priority over a QoS guarantee. From a viewpoint of user satisfaction, the communication charges are also an important parameter for wireless resource selection.

(5) Terminal Power Consumption

Since communication is not possible if a terminal battery fails during wireless communication utilization, the amount of power consumption needed for such communication is also an important factor in the selection of the wireless resource.

Taking the communication conditions above into consideration, the network selection processing portion (102) selects the external network for the wireless communication, the access points, and the communication system. The selection processing details are as follows.

The simplest method for taking the communication quality into consideration is to store a summary of the communication quality between each external network and this device (1) on the storage device (14) as a database. This is followed by, when receiving the above-described communication conditions, selecting the external network and the communication system in a manner to satisfy the required communication qualities.

However, with this method, it is necessary to measure and record a communication state between each communication terminal and base station in advance. Also, depending on the position of this device (1), since the communication quality varies, a good communication system may not be able to be selected all the time. To solve this, the connection rule is stored in the profile information (141) and a connection rule production portion (107) is arranged in the CPU (10). This configuration will be described next.

What kind of communication parameters should be employed to determine the connection rule will be described. Information that can be acquired corresponding to the above-described (1) to (5) requirement conditions is as follows.

(1) Wireless Information (1-1) Wireless Type

First, information on the type of wireless is essential. Since this is determined by the kind of communication module installed, this is known information for this device (1).

(1-2) RSSI (Received Signal Strength Indicator)

This is information to estimate the communication quality. The type of wireless, BER (Bit Error Rate) and other parameters can be utilized. These can also be acquired based on the information from the communication modules (11) and/or (12) using well-known techniques.

(2) Communication Quality (End-to-end QoS)
(2-1) Delay, Communication Delay Time
(2-2) Jitter
(2-3) Loss Rate The three items listed above are information essential for securing the service quality. The required QoS level varies depending on the type of application. These can be measured and calculated employing a well-known technique by the communication module(s) (11) and/or (12) and router processing portion (101).

(2-4) Access Point Band

A value used in this case is a value unique to the access point or wireless type, e.g., summarized above in (1-1). The value is introduced from the type of wireless.

(2-5) Utilizable Band

This is dynamic information that changes according to the utilization status of other terminals at the access point.

(2-6) Number of Terminals Connected to the Access Point

This is an index showing congestion of the access point. It may be difficult to measure the available band, and the number of connected terminals is often used as a parameter. For example, this can be obtained from the wireless LAN (3) access point.

(2-7) Application Type

This is information needed because the required QoS level varies according to the type of application. As indicated above, it is possible either to detect the type of application or to acquire the application information being executed from the terminal (4).

(3) Stability (3-1) Number of Terminals Connected to the Access Point
This is an index showing a congestion of the access point. It may be difficult to measure the available band, and the number of connected terminals is often used as a parameter. This information can be acquired by including in the communication conditions from each access point.

(3-2) Position of this Device
The position of this device can be acquired by providing a Global Positioning System (GPS) receiver (not shown) in this device (1).

(3-3) Movement Velocity
The movement velocity for the device can be acquired by providing an acceleration sensor or the like in device (1). It is possible to estimate an amount of time to stay at a particular access point within a coverage area.

(3-4) Coverage Area
It is possible to estimate a time that this device is capable of remaining at a particular wireless access by combining the coverage area for each wireless access with the position and movement velocity information of the device. To acquire this information, map information or the like of a communicable area for each wireless access is provided in the storage device (14).

(4) Cost
(4-1) Communication Charge
A reference for the optimal wireless resource can be obtained based on a balance between a guaranteed QoS and a communication charge. Therefore, charge information is needed when utilizing each wireless resource. Specifically, the communication charge can be calculated from timing means and a data table containing a list of charges.

(5) Power Consumption
(5-1) Power Consumption for this Device when Connected to Each Wireless Access
Since this device (1) is of mobile type, it can be powered by a battery. Thus, the battery capacity level and power consumption rate are information employed to estimate the amount of a time during which this device can be utilized. Data related to the estimated power consumption may be optionally stored in advance, and means for measuring actual power consumption may also be optionally provided.

Processing of the connection rule production portion (107) will be described.

This system is provided with an architecture for maximizing the level of a satisfaction depending on each user's preference in an environment where a communication quality dynamically fluctuates. Thus, the level of a user satisfaction is not simply the QoS of the application but also includes a level of user psychological satisfaction. Therefore, determining how to express the level of satisfaction in a numerical value and reflect that value in the connection rule when a certain user utilizes a certain wireless resource is an issue.

The above-described required conditions include a wide variety of types, from a type that can be depicted in a graph with respect to the level of user satisfaction such as the communication charge, to a type that cannot be directly mapped with respect to the level of user satisfaction such as an RSSI. This information can be roughly classified into four types, i.e., a communication quality, an application QoS, a subjective evaluation value, and a level of user satisfaction.

Herein, the communication quality refers to quality information that can be measured, such as an RSSI, a delay, a jitter, and a loss rate.

The application QoS refers to quality information in an application layer, such as a signal to noise ratio (S/N) in a video application.

The subjective evaluation values refer to a value evaluated by humans for the quality of the application. Five human senses are used to establish an evaluation reference that is closer to the user psychological satisfaction than that of the application QoS.

The level of user satisfaction is an evaluation value expressing a subjective level of satisfaction that reflects the preferences of each user.

This information can be converted to enable mapping with the level of user satisfaction. Accordingly, it is believed that all of the information can be reflected in the wireless resource selection.

Of these four types of information, the communication quality and the application QoS are closely correlated, and various research is performed on the reciprocal conversion of the both. Also, regarding the subjective evaluation value, an application QoS required value emerges to achieve the targeted Mean Opinion Score (MOS) value so the conversion of both is also possible from the accumulation of subjective evaluation experiments.

These well-known correlations are provided in the connection rule production portion (107), as conversion conditions, in advance, and thus, definitions can be made based on the required conditions. In this case, an issue of the conversion between the user satisfaction and the subjective evaluation value remains. The subjective evaluation performs an evaluation in a precisely stipulated measurement environment such as International Telecommunications Union Radiocommunication Sector (ITU-R). However, for example, in the case of video streaming, when playing back a video with the same evaluation marks, there are users who are not satisfied, indicating "I'm getting charged this amount for only getting this level of image quality?", as well as adequately satisfied users who say "I get this good quality image with a mobile phone?".

Figure 7A:
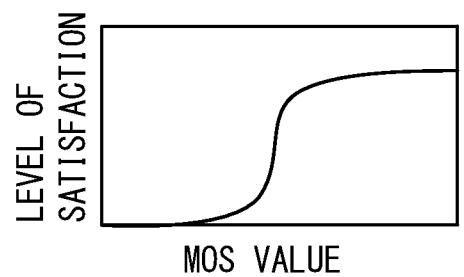
FIG. 7 is a graph showing a relation between a subjective evaluation value (MoS value) and the level of satisfaction.
Figure 7B:
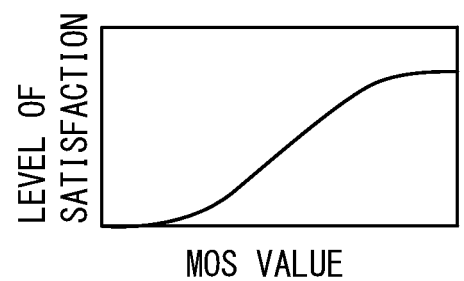
Figure 7C:
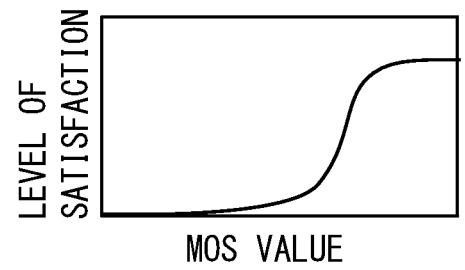

For example, there are various patterns such as those shown in FIG. 7, where graphs with the subjective evaluation value (MOS value) on a horizontal axis and the level of satisfaction on a vertical axis vary by user. A relationship between the MOS value and the level of satisfaction for a certain user is as shown in FIG. 7(a). This graph expresses that if a threshold value (equal to a certain MoS value) is exceeded, the user is satisfied; and if that value is fallen below, the user is dissatisfied. On the other hand, there may be a user whose graph exhibits a more gradual curve as shown in FIG. 7(b), and a user whose graph exhibits a higher threshold value as shown in FIG. 7(c).

Figure 8:
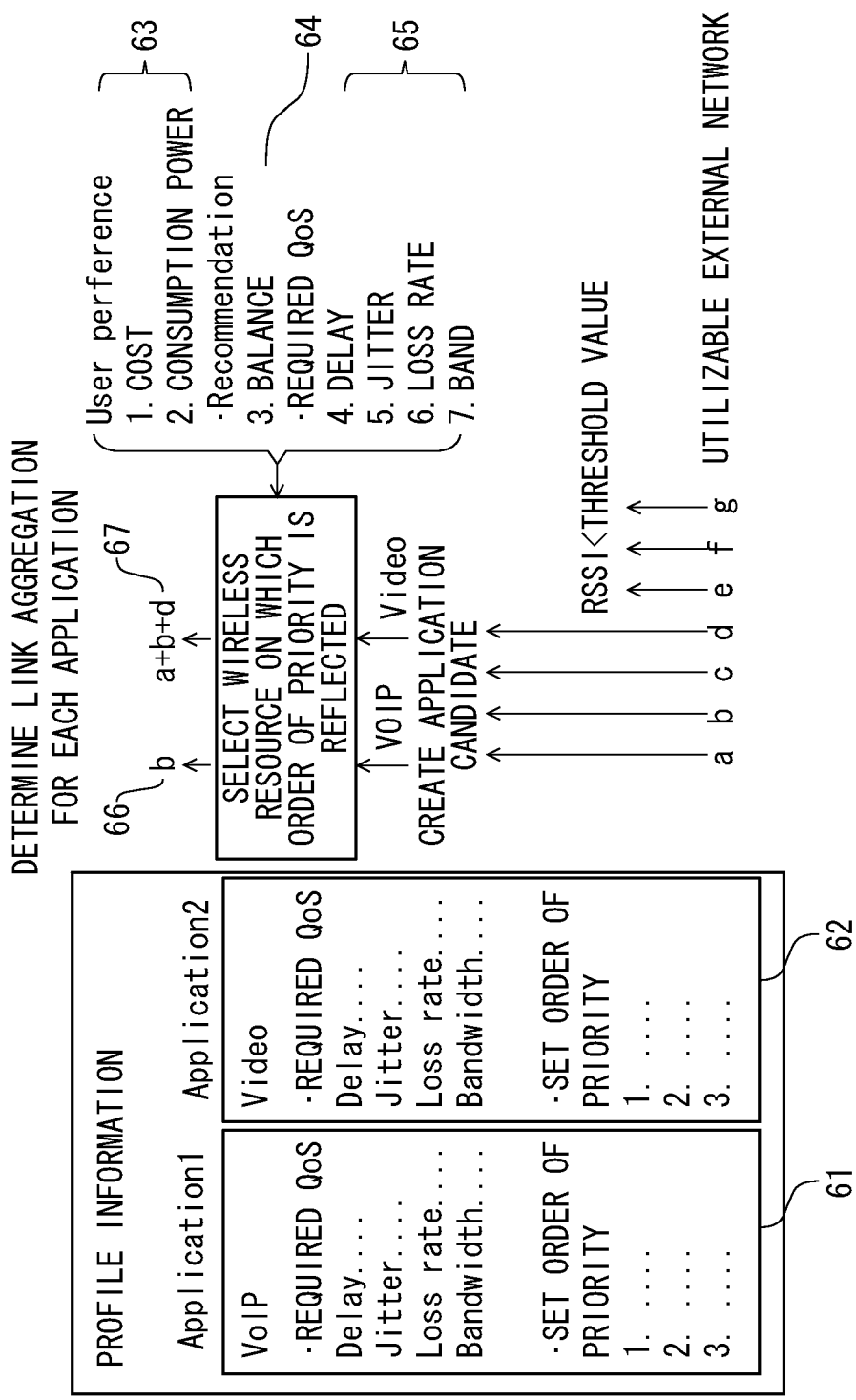
FIG. 8 is a selection algorithm of a wireless resource that meets a user preference.

The connection rule production portion (107) is designed to create a correspondence between the level of satisfaction and the MOS value for each user and each application and to maximize the level of user satisfaction by reflecting it on the wireless resource selection. As shown in FIG. 8, as the profile information (141), the required QoS and the order of priority for the connected external network (for the Voice over Internet Protocol (VoIP) application (61)) are set. In the same manner, definitions are also made for the video application (62).

Additionally, a connection rule determining to select which external network according to an application executed by the terminal (4) is produced. For example, utilizable external networks a, b, c, d, e, f and g are provided. In this example, all of these networks are wireless LAN access points.

One of the networks a, b, c or d in which an RSSI value firstly obtained from a communication module scan exceeds a threshold value are selection candidates.

Also, the application stored in the profile information (141) is used as an application candidate, and in this state, the external network (wireless resource) optimal therefore is selected. At this point, the selection is made to satisfy the required conditions (63) regarding cost, power consumption and required QoS (64) of the profile information determined by the user. For example, of the utilizable external networks, networks that satisfy the required QoS (64) are first selected as the selection candidates. Subsequently, the selection candidates are narrowed to those that meet the user cost requirement and power consumption requirement (63). The cost requirement is defined by a maximum communication charge, a unit cost per time, a unit cost per packet, or the like. With respect to the requirements relating to the power consumption, the user may optionally provide a power consumption of a terminal and a battery capacity, and in this state, the user may set as a usable time.

In addition to the required condition (63) and the required QoS (64) set by the user, the balance of the level of user satisfaction (64) may be optionally taken into consideration. For instance, the balance information can be set as a rule for selecting a better selection candidate if the level of satisfaction rises by a predetermined value or more with a predetermined cost fluctuation width.

Using the algorithm described above, the connection rule production portion (107) selects a communication method b (66) in the case of the VoIP application (61) and selects a link aggregation (67) by communication methods a+b+d in the case of a video applications (62). These selection results are stored in a connection rule table. The network selection processing portion (102) is capable of selecting the external network according to the application used by referencing the connection rule table.

As described above, a link aggregation technique can be employed for connection with the external network. That is, a server device provided with link aggregate management portion is installed on the external network side to establish a link aggregation with a link aggregate management portion (108) arranged on the CPU (10) of this device (1). Since connection processing using the link aggregation is well known, the description will be omitted.

When the link aggregation is employed in this device (1), good communication can be realized in the terminal (4) without the need o provide a plurality of communication modules in the terminal (4) or introducing software for link aggregation. In particular, by combining with the selection of a network according to the application, the optimal communication quality can be obtained without a need of recognition on the terminal (4) side.

In the above-described embodiments, the re-selection button (15) is arranged as hardware. According to further embodiments, the re-selection button according to the present invention can include a mode for accepting a user's instruction by software. For example, "re-select network" may be displayed on a display panel so that the user can select that function.

In this case, a re-selection button image display portion (not shown) is provided in the CPU (10), and a suitable input device for accepting input from the user is arranged in the device (1). The input device may include a keyboard, a mouse, a touch panel, or the like. When the user designates the re-selection button image, the notification portion (103) instructs re-selection to the network selection processing portion (102).

Even in a configuration to display the re-selection button as an image in this manner, the user is capable of easily designating the network switching, and thus, the effect of the present invention can be provided. It is noted that as the button, two types, i.e., a button for processing selection of the optimal network as shown in the foregoing FIG. 3 and a button for processing selection of a network different from the current network as shown in FIG. 4 may be arranged.

Figure 9:
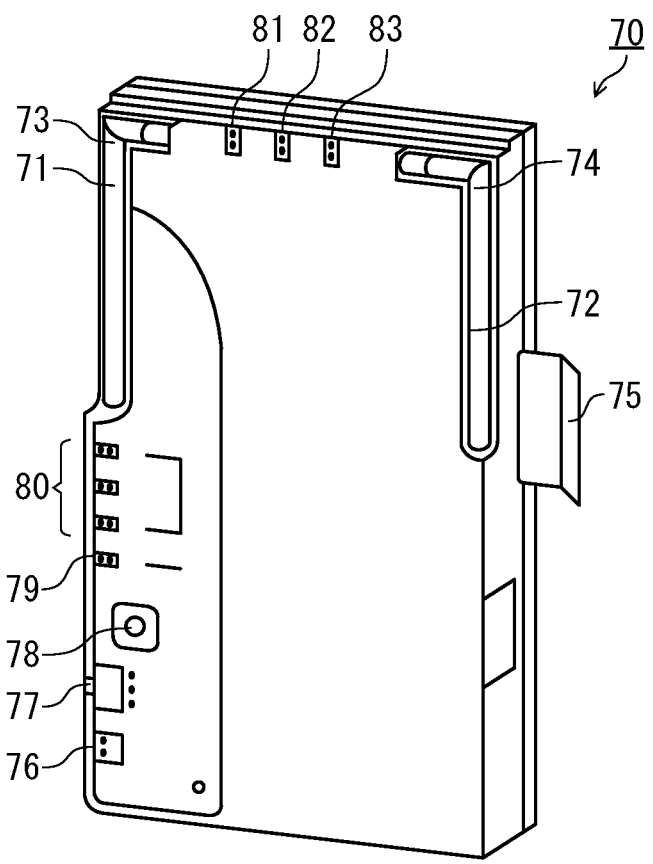
FIG. 9 is a perspective view showing the exterior of the present invention.

Finally, an embodiment of the exterior and the structure of the device (70) will be described. FIG. 9 is a perspective view showing the exterior of this device (70). This device (1) is easily portable with a size that can be held in a hand. Two antennas (71) and (72) are arranged on both the top right and left sides. When carried, antenna base portions (73) and (74) at the top end are made foldable, and thus, it can be accommodated in a recess that matches the shape of the antennas (71) and (72). During use, a communication sensitivity can be enhanced by extending the antennas upwards from the recess.

A slot (75), into which a CF card is inserted, is provided in the middle of a side surface so as to be used for holding a PHS communication card, or the like.

User operation systems include, in order from the bottom right, a jack (76) for supplying power, a power switch (77), and also, a re-selection button (78) of the present invention. When the user depresses this button, the function of the present invention can be utilized.

Included are indicators, such a light emitting diode (LED) (79) showing a connection status of the internal networks (wireless LAN), LEDs (80) showing a connection status of external networks (wireless LAN, CF cards, USB), a power display (81), an LED (82) showing an operation status, and a battery remaining amount display (83).

Figure 10:
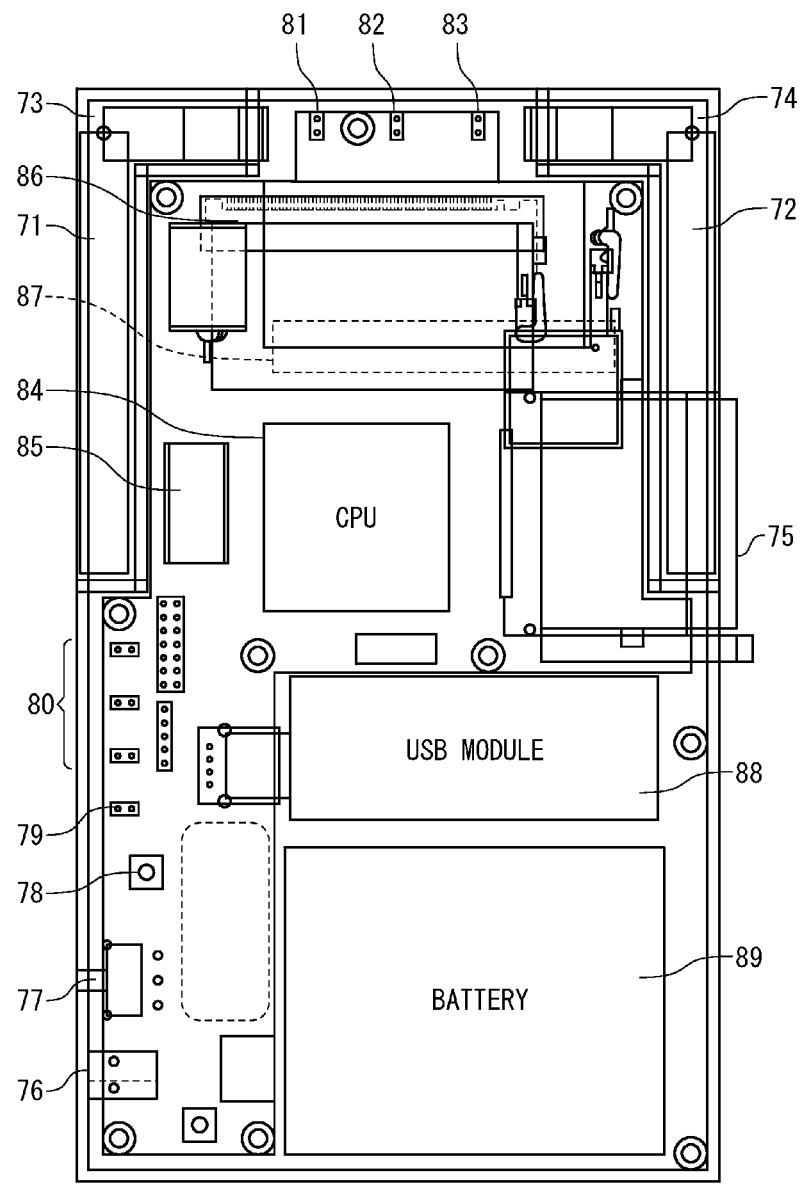
FIG. 10 is an exploded view showing the interior of the present invention.

FIG. 10 is an exploded view showing the internal structure of this device (70). In addition to the placement of a Synchronous Dynamic Random Access Memory (SDRAM) (85) configuring a CPU (84) and storage device on a circuit board, there are MiniPCI slots (86) and (87) arranged on both surfaces of the circuit board. In this way, the wireless LAN modules for the external network and the internal network can be connected, respectively.

Furthermore, a USB module (88) and a communication module for a USB connection can also be housed. A chargeable battery (89) for driving when carrying is housed at a lower portion of the main unit.

The methods and system of the present invention has been described above and in the attached drawings; however, modifications will be apparent to those of ordinary skill in the art and the scope of protection for the invention is to be defined by the claims that follow.

We claim:

1. A communication connection device for establishing communication between a terminal device and an external network comprising:
   a connection path connecting the terminal device;
   a single or a plurality of external network communication adaptors compatible with one or more external networks;
   a network selection processing portion for automatically selecting a network from the external networks in accordance with stored profile information and priority information for each external network including an order of priority of the plural external networks;
   a re-selection processing instruction mechanism configured to cause, as a result of a user's operation, the network selection processing portion to start selection processing;
   an external network connection processing portion for establishing or reconfiguring the connection to an external network selected by the network selection processing portion in accordance with said stored order of priority; and
   a communication relay processing portion for relay-processing the communication between the communication terminal and the external network;
   wherein said communication connection device is a user-portable mobile communication connection device, and
   said re-selection processing instruction mechanism is formed by a switch disposed on a device external surface;
   and the communication connection device further comprising a notification portion for detecting an input operation of the switch and notifying the network selection processing portion of the detection.

2. The communication connection device according to claim 1, wherein said connection path is configured to be an internal network connecting with a single or a plurality of specific terminal devices, and said communication connection device includes an internal network communication adaptor compatible with the internal network and an internal network connection processing portion for establishing or reconfiguring the connection to the internal network.

3. The communication connection device according to claim 1, wherein
   said network selection processing portion selects, when there is an instruction to start the selection processing from said re-selection processing instruction mechanism, a network different from a type of external network or a communication system currently selected, based on said stored order of priority.

4. The communication connection device according to claim 1, wherein in said stored profile information, said order of priority is as between at least one of types of external networks to be connected or communication systems,
   said order of priority being defined by a user.

5. The communication connection device according to claim 1, wherein
   in said stored profile information, verification information necessary for connection to each external network is stored, and said external network connection processing portion employs the verification information in establishing or reconfiguring the connection to the external network.

6. The communication connection device according to claim 1, wherein in a configuration in which a selection rule for a communication channel when said external network is a wireless LAN is provided in said profile information, said network selection processing portion acquiring information about an available channel at a current site from said external network connection processing portion, when there is an available channel, produces an available channel table tabulating, for each channel, numbers of successive available channels before and after a currently selected channel, and selects the channel according to an available status on the available channel table.

7. The communication connection device according to claim 1, wherein in a configuration in which a communication channel selection rule for when said external network is a wireless LAN is provided in said stored profile information, said network selection processing portion acquires a signal strength of a channel in use at a current site from said external network connection processing portion, produces a signal strength table tabulating signal strengths of channels in use, and selects the channel according to the signal strength for each channel on the signal strength table.

8. The communication connection device according to claim 7, wherein said network selection processing portion of the communication connection device selects, when there is the available channel on said available channel table, a channel with a largest number of successive available channels before and after, and selects, when there is no available channel, a channel having a weakest signal strength from the signal strength table.

* * * * *